A. N. MASON.
TIRE REMOVER AND REPLACER.
APPLICATION FILED NOV. 20, 1915.
1,215,680.
Patented Feb. 13, 1917.
3 SHEETS—SHEET 1.
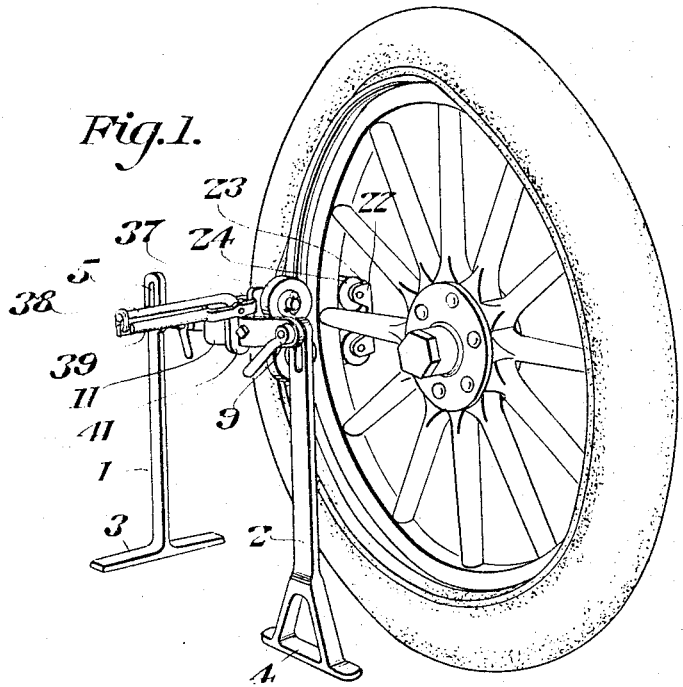
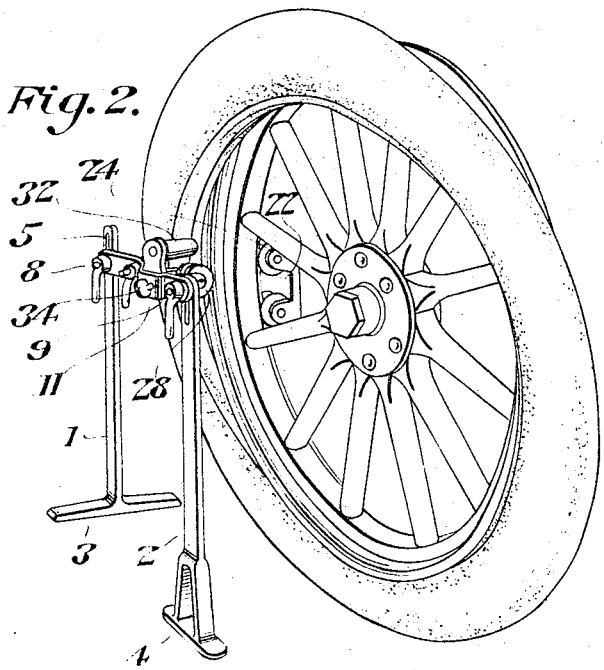
Inventor
Alfred N. Mason
Witnesses
By Victor J. Evans
Attorney

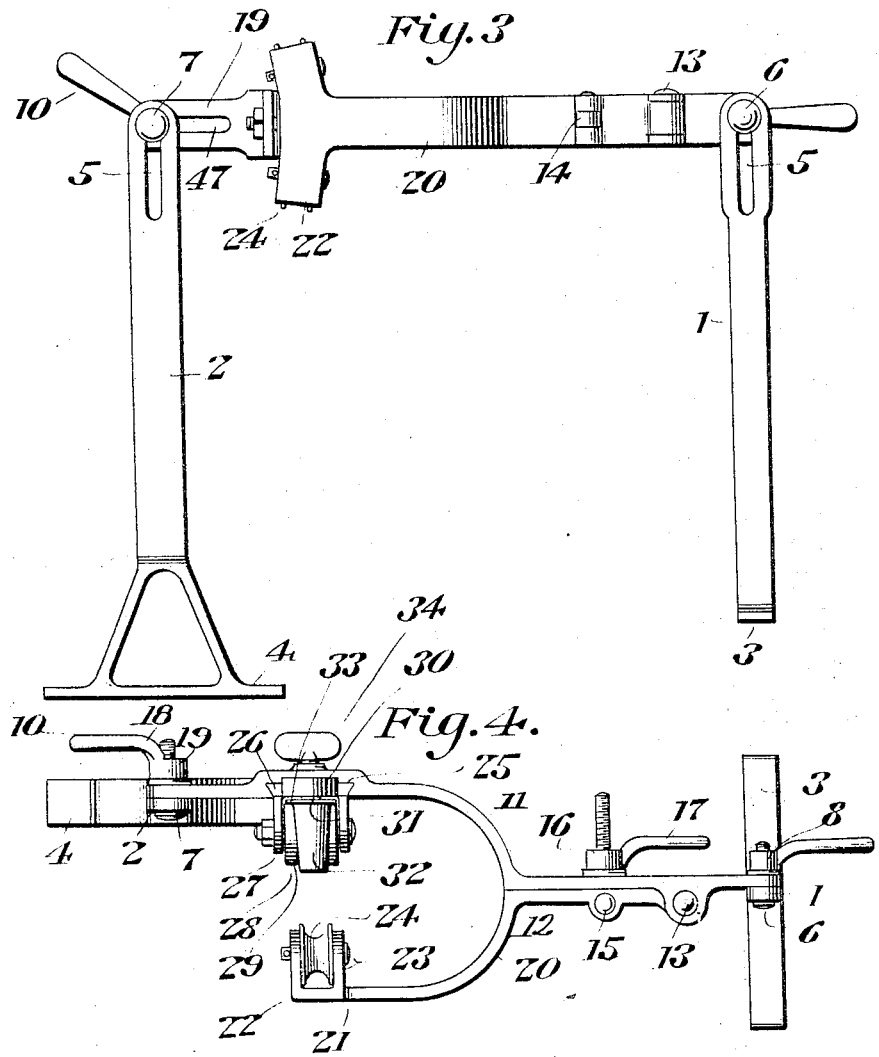

A. N. MASON.
TIRE REMOVER AND REPLACER.
APPLICATION FILED NOV. 20, 1915.
1,215,680.
Patented Feb. 13, 1917.
3 SHEETS—SHEET 3.
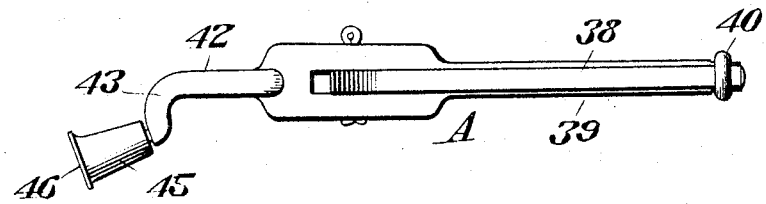
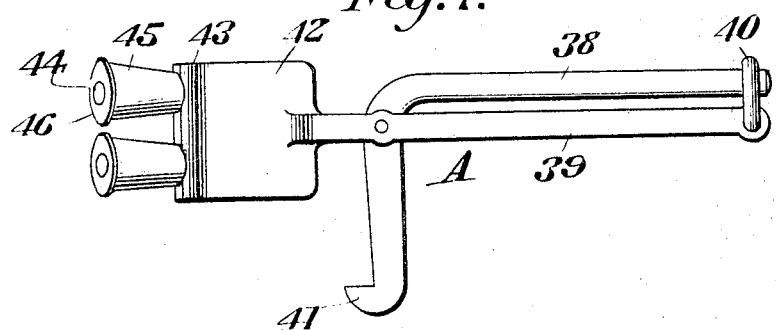
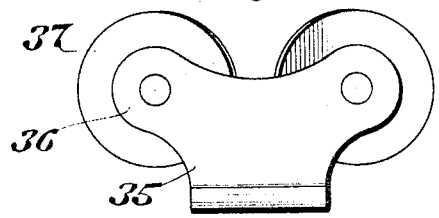
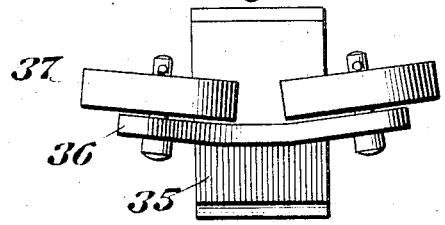
Inventor
Alfred N. Mason
Witness
By Victor J. Evans
Attorney

UNITED STATES PATENT OFFICE.

ALFRED N. MASON, OF PADUCAH, KENTUCKY.

TIRE REMOVER AND REPLACER.

1,215,680.   Specification of Letters Patent.   Patented Feb. 13, 1917.

Application filed November 20, 1915. Serial No. 62,594.

*To all whom it may concern:*

Be it known that I, ALFRED N. MASON, a citizen of the United States, residing at Paducah, in the county of McCracken and State of Kentucky, have invented new and useful Improvements in Tire Removers and Replacers, of which the following is a specification.

This invention relates to tire removers and replacers, the object of the invention being to produce a light, portable and efficient device or machine by means of which a tire may be rolled off a rim in a very short space of time and again rolled upon the rim in an equally short space of time, the rolling of the tire on and off the rim being effected by turning the wheel containing the tire, in relation to the apparatus of this invention which is held stationary during the turning movement of the vehicle wheel.

A further object of the invention is to so combine the parts of the tire remover and replacer that they may be folded quickly into compact relation to each other thereby enabling the device as a whole to be stored in an automobile.

A further object in view is to provide means whereby the device as a whole may be easily adjusted to wheels of different diameters so that the elements which act directly on the tire and rim or felly of the wheel may be adjusted at the proper place to produce the best results.

With the above and other objects in view, the invention consists in the novel construction, combination and arrangement of parts, as herein described, illustrated and claimed.

In the accompanying drawings:—

Figure 1 is a perspective view showing the device of this invention in its relation to a wheel and tire during the operation of removing the tire from the rim.

Fig. 2 is a similar view showing the operation of replacing the tire on a rim.

Fig. 3 is an enlarged side elevation of the device.

Fig. 4 is a plan view thereof.

Fig. 5 is a perspective view of the tread used for replacing a tire on a rim.

Fig. 6 is a top edge view of the device for removing the tire.

Fig. 7 is a side elevation of the same.

Fig. 8 is a side elevation of the felly, pressure rollers and their supporting head.

Fig. 9 is a view of the same parts looking toward the peripheries of the rollers.

The removing and replacing device comprises normally vertical frame-supporting standards 1 and 2 having extended bases 3 and 4 to sustain them in a vertical position, each of said standards being formed in the upper end portion thereof with a longitudinal slot 5, for vertical adjustment by the bolts 6 and 7 and handle nuts 10 of the frame comprising sections 11 and 12 which are hinged together by a pivot 13. The frame is horizontally disposed and the pivot 13 is disposed vertically enabling the sections 11 and 12 to be moved in a substantially horizontal plane toward and away from each other. The frame sections 11 and 12 are adjusted in relation to each other by means of an eye bolt 14 which passes through a slot in the frame section 11 and is connected by a pivot 15 to the section 12 of the frame. An adjusting nut 16 is threaded on the bolt 14 and provided with an operating handle or lever 17. The frame section 11 is curved at 18 to provide an offset arm 19 and the section 12 of the frame is curved at 20 to provide an arm 21 the end portion of which is substantially parallel and in spaced relation to the arm 19. The arm 21 is formed with a T-shaped end portion 22 which is curved as shown in Fig. 3 and provided with upper and lower sets of spaced ears 23 between which are journaled upper and lower pressure sustaining rollers 24 which as shown in Figs. 1 and 2 are adapted to bear against one edge of the wheel rim.

The arm 19 is formed with a dove-tailed seat or groove 25 extending transversely of said arm and adapted to receive the correspondingly shaped base 26 of a tire replacing device which embodies ears 27 between which is journaled a roller 28 having flanges 29 thereon in spaced relation to each other. An additional ear 30 is provided to hold a stud shaft 31 on which is journaled a tapering roller 32 flanged at its inner and larger end as shown at 33. The roller 32 turns on an axis substantially at right angles to the axis of the roller 28 and is located about midway between the flanges 29 of the roller 28. When the tire replacing device just described is properly positioned in the dove-tailed seat 25 of the arm 19, it is held fixedly by means of a set screw 34.

As shown in Fig. 2, the roller 28 bears against the opposite side of the wheel rim from the pressure sustaining rollers 24 and in placing a tire on the rim, the tire is positioned partly on the rim of the wheel with its inner or rim face bearing and working against the roller 32. Then by turning the wheel and tire on the axis of the wheel, the tire is crowded upon the rim in the manner clearly illustrated in Fig. 2, the wheel being turned through a complete revolution in order to force the tire thereon in its final position.

In order to remove a tire from a rim, the tire replacing device is detached from the arm 19 by loosening the set screw 34 and in place of said tire removing device, a roller supporting head 35 is substituted therefor and held in place by again tightening the set screw 34. The head 35 is provided with laterally extending ears 36 on which are journaled felly pressure rollers 37 preferably of rubber or some material which will not injure the finish of the felly of the wheel, the rollers 37 bearing against the felly of the wheel in opposition to the pressure sustaining rollers 24 which bear against the rim of the wheel at the side opposite the rollers 37. A tire removing device designated generally at A is then clamped upon the arm 19 as shown in Fig. 1, said device comprising a pair of levers 38 and 39 one of which carries at its extremity a retaining loop 40 pivotally connected therewith and adapted to embrace the extremity of the other lever as shown in Figs. 6 and 7. The lever 39 is adapted to bear against one edge of the arm 19 while the other lever 38 is provided at its extremity with a hook or shoulder 41 adapted to bear against the opposite edge of said arm 19 thereby securely fastening the device A on the arm 19. The lever 39 has its inner end enlarged to form a roller supporting head 42 which is offset as shown at 43 and provided with a pair of journals 44 on which are mounted tapered rollers 45 the outer and larger ends of which are flanged or headed as shown at 46. By reference to Fig. 6, it will be noted that the rollers 45 set at an angle oblique to the general direction of the levers 38 and 39 and also oblique with respect to the adjacent side of the rim of the wheel, the end flanges or heads 46 of the rollers 45 being adapted to engage the inner or rim face of the tire and draw the tire off the rim as the wheel and tire are turned on the axis of the wheel in the manner illustrated in Fig. 1. The arm 19 is formed at one end with a longitudinal slot 47 to receive the bolt 7 above referred to thereby enabling the standard 2 to be adjusted toward and away from the standard 1 to allow proper clearance for tires of different cross sectional diameters. The extended bases 3 and 4 of the standards 1 and 2 admit of the operator placing his foot on either standard for additionally bracing the tire removing and replacing apparatus as may be found expedient.

From the foregoing description, taken in connection with the accompanying drawings, it will now be understood that the removal or replacement of a tire in relation to the rim is effected by means of rollers carried by a supporting frame and rendered operative for carrying out their functions by turning the tire and wheel through a complete revolution and without requiring any other operation or the use of any other tools with the exception of a suitable implement for primarily starting the tire off the rim so as to place said tire in proper relation to the rollers acting thereon either for the purpose of crowding the tire on the rim or drawing the tire off the rim. By actual test and demonstration with a full size device in connection with an automobile wheel and tire, it has been found that a tire may be removed from the rim of a wheel in approximately one minute and replaced thereon in the same period of time. When the device is not in actual use, it may be folded compactly by loosening the nuts 10 and folding the standards 1 and 2 toward the frame which they support when in operative position. This enables the device as a whole to be carried in an automobile, motor truck or similar vehicle so that it is always handy for use.

Having thus described my invention, I claim:—

1. In a portable device for removing and replacing pneumatic tire casings from vehicle wheels while the latter remain on the vehicle, the combination of a substantially horizontal frame, means for supporting said frame at an elevation and permitting the same to be raised and lowered to suit wheels of different diameters, said frame embodying a pair of bowed sections pivoted to each other for relative movement on a substantially vertical axis and shaped to extend past opposite sides of a tire into the circular plane of the rim, means for moving the free ends of said sections toward each other and holding them in fixed relation, pressure sustaining rim engaging rollers carried by each of said frame sections, and means carried by one frame section and adapted to operate against a tire for shifting said tire laterally in relation to the rim of the wheel as the wheel is turned on its axis.

2. In a portable device for removing and replacing pneumatic tire casings from vehicle wheels while the latter remain on the vehicle, the combination of a substantially horizontal frame, means for supporting said frame at an elevation and permitting the same to be raised and lowered to suit wheels of different diameters, said frame embodying a pair of bowed sections pivoted to each other for relative movement on a substantially vertical axis and shaped to extend past opposite sides of a tire into the circular plane of the rim, means for moving the free ends of said sections toward each other and holding them in fixed relation, pressure sustaining rim engaging rollers carried by each of said frame sections, and interchangeable devices detachably fastened to one frame section and adapted to act upon the tire to crowd the tire laterally in relation to the rim as the wheel is turned on its axis.

3. In a portable device for removing and replacing pneumatic tire casings from vehicle wheels while the latter remain on the vehicle, the combination of a substantially horizontal frame, means for supporting said frame at an elevation and permitting the same to be raised and lowered to suit wheels of different diameters, said frame embodying a pair of bowed sections pivoted to each other for relative movement on a substantially vertical axis and shaped to extend past opposite sides of a tire into the circular plane of the rim, means for moving the free ends of said sections toward each other and holding them in fixed relation, pressure sustaining rim engaging rollers carried by one of said frame sections, and means carried by said frame for shifting a tire laterally in relation to a rim, the last named means embodying a tapered roller journaled on said frame section and against which the tire bears, and a flanged roller coöperating with the wheel rim to sustain said tapered roller in a definite relation to the tire and rim.

In testimony whereof I affix my signature in presence of two witnesses.

ALFRED N. MASON.

Witnesses:
   THELMA RYBURN,
   B. A. PETTER.